Figure 1:
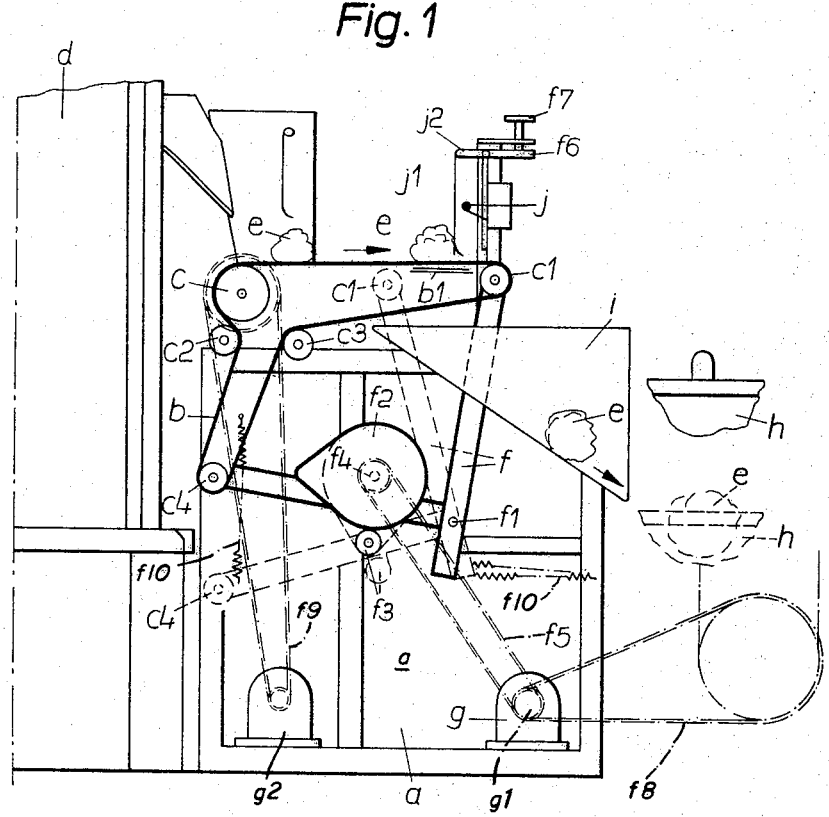

Dec. 26, 1967     K. KEMPER     3,360,098
APPARATUS FOR TRANSFERRING LUMPS OF DOUGHY MATERIAL
FROM ONE PROCESSING MACHINE TO ANOTHER
Filed Nov. 10, 1965

*Inventor*
KATE KEMPER

BY *Rupert J. Brady*
ATTORNEY

United States Patent Office 3,360,098
Patented Dec. 26, 1967

3,360,098
APPARATUS FOR TRANSFERRING LUMPS OF DOUGHY MATERIAL FROM ONE PROCESSING MACHINE TO ANOTHER
Kate Kemper, 8–10 Langestrasse, 4833 Neuenkirchen uber Gutersloh, Germany
Filed Nov. 10, 1965, Ser. No. 507,171
Claims priority, application Germany, May 31, 1965, 56,272
5 Claims. (Cl. 198—21)

The invention relates to a apparatus for automatically supplying or transferring lumps of doughy material such as baking dough from one processing machine to another, in the course of which supply or transfer of the lumps of baking dough may be effected at different intervals of time on a conveyor belt.

The process of working up baking doughs differs with the type of dough. Thus bread doughs of wheat and mixed wheat are worked up differently from bread doughs of rye and mixed rye. While the rye and mixed rye bread doughs are made up directly, i.e. continuously, wheaten and mixed wheat doughs require a leavening interval (resting period) between kneading and stretching, according to their gluten content. In this case, the working-up process is interrupted or discontinuous. A continuous working-up of wheaten and mixed wheat dough is, however, possible if a leavening cabinet is incorporated in an automatic dough-processing apparatus.

From the dough-dividing machine the lumps of dough arrive at a kneading machine and are thence transferred to the leavening cabinet. This transfer has hitherto been effected by a drum with trough-shaped recesses or pockets. The drum is driven periodically in steps with the circulation of the dough pockets in the leavening cabinet. On the other hand, transfer by means of a forked wheel has also been proposed. However, both forms of construction by no means ensure a perfect transfer of the lumps of dough. Often, two lumps reach a pocket simultaneously. As long as small weights are involved, that is lumps of about 500 to 800 grams, the pockets are still able to accommodate two lumps at once. If the weights are, however, of 1650 grams, as is often the case with lumps of dough for breakfast rolls and doughs for mixed wheat bread, considerable disturbances occur. Even having regard to the fact that the leavening cabinet discharges somewhat more quickly than run the machines preceding same in the apparatus, it has not been possible hitherto to attain a continuous transference of the lumps of dough without supervision.

Even if delaying of the lumps of dough in the dough-dividing machine is not important, nevertheless the passage of the lumps of dough through the kneading machine is irregular in time, no matter what type of kneading machine is incorporated in the apparatus.

In all kneading machines, conveyance of the lumps of dough through the machine is determined almost exclusively by the frictional resistance of the lumps. An object of the present invention is to obviate or mitigate these disadvantages.

The present invention is apparatus for transferring lumps of doughy material such as baking dough from one processing machine to another processing machine at intervals of time which differ from one another, comprising a conveyor belt having an upper run for receiving said lumps singly and separately from one another and in a periodic sequence from said one processing machine and progressing same, and means adapted to be driven by said another processing machine to effect delivery from said conveyor belt of the leading said lump of dough on said conveyor belt.

Figure 2:
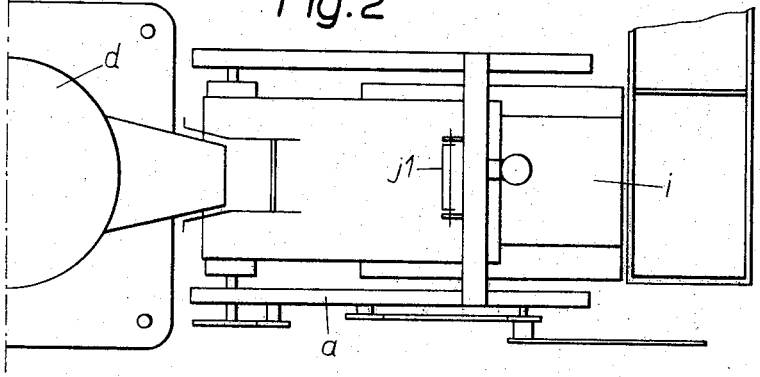

An embodiment of the invention will now be described, by way of example, with reference to the accompanying drawing, in which FIGS. 1 and 2 are, respectively, a longitudinal vertical section and a plan of apparatus for supplying or feeding lumps of baking dough, for example, from one processing machine to another.

Referring now to the drawing, apparatus for supplying or feeding lumps of baking dough from one processing machine to another comprises essentially a housing or frame $a$ in an upper part of which is disposed a conveyor belt $b$. Besides running over a driving roller $c$, the conveyor belt runs over free-wheeling guide rollers $c^1$, $c^2$, $c^3$ and $c^4$ which run on ball bearings. The conveyor belt serves to transport the lumps $e$ of dough falling thereupon from the kneading machine $d$.

An equal-armed bell-crank lever is denoted $f$ and its fulcrum is centred on the axis $f^1$. The free-wheeling rollers $c^1$ and $c^4$ are carried by the lever $f$.

The equal-armed bell-crank lever is moved downwards through the medium of a pulley $f^2$ having at its periphery an eccentric cam which acts on a roller $f^3$ securely connected to the bell-crank lever. The eccentric pulley $f^2$ is driven through the shaft $f^4$ by a chain or belt $f^5$ directly from an electric motor $g$. The $f^5$ chain or belt passes around one sprocket of a double sprocket $g^1$, the other sprocket of which is engaged by a chain or belt $f^8$ transmitting the drive to the receiving pockets $h$ of a leavening cabinet through control pulleys and reduction gearing. The drive to the chain or belt $f^5$ is coupled with the drive of the receiving pockets $h$ of the leavening cabinet. By this construction and arrangement, after the conveyor belt $b$ has been stopped, to be described more fully hereinafter, the driving roller $c$ does not permit the conveyor belt to run back over same and the downward movement of the belt crank lever $f$ causes the belt to roll on idler rollers $c^1$, $c^3$ and $c^4$ with the result that part of the upper run of the belt is withdrawn from below the leading lump of dough to an extent sufficient for said leading lump to drop gravitationally through opening $b^1$ on to a chute $i$ therebelow, the chute providing an intake to receiving pockets $h$ of a leavening cabinet.

FIG. 1 shows the apparatus shortly before the transfer of a lump of dough, which is shown by broken lines in association with a chute $i$. The chute $i$ serves to guide the lumps of dough shortly before their reception in the pockets of the leavening cabinet.

The driving pulley $c$ is driven by way of a chain or belt $f^9$ from an electric motor $g^2$ which is energised from the same switching arrangement as the motor $g$. A microswitch $j$ acts as a cut-out switch for the belt drive and when it is actuated the circuit is broken.

Activation of the microswitch $j$ is brought about by a stop flap $j^1$ pivotally mounted on a shaft $j^2$.

As can be seen from FIG. 1 the lump of dough is conveyed by the belt in the direction of the arrow.

Owing to the lump of dough coming up against same, the stop flap engages the microswitch $j$, thus cutting out the motor $g^2$ and immediately stopping the conveyor belt. At this occurrence, the lump of dough is above the drop opening $b^1$.

As the cam-carrying pulley $f^2$ is driven through the shaft $f^4$ by means of a chain drive $f^5$ from an electric motor $g$ of the next following machine, the roller $f^3$ is moved downwardly, as is also the bell-crank lever $f$ securely connected thereto, by the cam of the pulley $f^2$, and this withdraws the conveyor roller $c^1$ and exposes the drop opening $b^1$. The lump of dough $e$ falls downwardly and is admitted into a pocket of the leavening cabinet by way of the chute $i$.

As soon as the lump of dough has been released by the bell-crank lever, the stop flap $j^1$ is freed and the microswitch $j$ is inactivated so that the motor $g^2$ again starts up, the lever resumes its original position by means of tension springs $f^{10}$ connected between the frame and the respective arms of the lever, and the conveyor belt again moves in the direction of the arrow and so continues until the next lump of dough coming up against the stop flap cuts off the drive to the belt through the intermediary of the microswitch. It will be noted that all movements following stoppage of the belt are under the control of the second processing machine.

The stop flap $f^1$ is turnable about the shaft $f^2$ in a frame $f^6$. This frame is supported about the shaft $f^2$ and is set in the required position by means of an adjusting member $f^7$. The extent of advance of the stop flap is determined by this adjustment. Through the displacement of the flap in relation to the deflection of the bell-crank lever (see the broken line position in FIG. 1), the outlet width of the drop opening is regulated. Thus, there is a narrow or small outlet width for small weights, and a correspondingly wide or large outlet width is provided for large weights.

A constant opening can alternatively be achieved by another form of the cam-carrying pulley, such opening being then determined, however, by an additional adjustment of a stop which acts on the bell-crank lever.

The apparatus operates fully automatically and with precision.

I claim:

1. In combination, apparatus for transferring lumps of doughy material from one processing machine to another, comprising, conveyor belt means having one end positioned in proximity to said one processing machine for sequentially receiving lumps of dough therefrom, said conveyor belt means comprising a frame, a bell-crank lever, means pivotally connecting said bell-crank lever to said frame, idler rollers mounted on the ends of the arms of said bell-crank lever and on said frame, a drive roller rotatably mounted on said frame, an endless belt extending around said drive roller and idler rollers and means operatively connected to the drive roller for periodically stopping said endless belt, discharge means operatively connected to the bell-crank lever to cause said bell-crank lever to periodically oscillate about said pivot means after said endless belt has been stopped to thereby withdraw the endless belt from below a lump of dough carried thereon; said another processing machine including a conveyor having a plurality of lump-receiving pockets, drive means operatively connected to said pocket conveyor for sequentially positioning each pocket in proximity to the opposite end of said conveyor belt means, and transmission means operatively connected between said drive means, and said discharge means, whereby the discharge means is actuated to discharge a lump of dough from the conveyor when a lump-receiving pocket is positioned adjacent the opposite end of the conveyor belt means.

2. In combination, apparatus for transferring lumps of doughy material from one processing machine to another according to claim 1, wherein said discharge means comprises a cam rotatably mounted on said frame and a cam follower mounted on one of the arms of said bell-crank lever, whereby upon rotation of said cam the bell-crank lever is caused to oscillate about said pivot means.

3. In combination, apparatus for transferring lumps of doughy material from one processing machine to another according to claim 2, wherein said drive means comprises a motor having a pulley and belt assembly connected to the pocket conveyor, said transmission means comprising a second pulley and belt assembly connected to said motor and to said cam.

4. In combination, apparatus for transferring lumps of doughy material from one processing machine to another according to claim 1, wherein said means for periodically stopping said endless belt comprises a motor having a sprocket and belt assembly connected to the endless belt drive roller, a depending flap pivotally mounted on said frame, the lower end of said flap being positioned a predetermined distance above the endless belt in proximity to the opposite end thereof, said flap being adapted to be successively engaged by the doughy lumps carried on said endless belt, and switch means connected between said flap and said endless belt motor, whereby when a doughy lump engages said flap said switch means is opened to de-energize said endless belt motor to thereby stop said endless belt.

5. Apparatus for transferring lumps of doughy material from one processing machine to another according to claim 4, wherein an opening is formed in the frame through which the doughy lumps are discharged from the endless belt, said opening being positioned adjacent the lower end of said flap, and adjustment means operatively connected to said flap for moving the lower end of said flap over said opening, whereby the size of the opening can be varied to accommodate doughy lumps of various sizes.

References Cited

UNITED STATES PATENTS 2,540,945  2/1951  Hart _____ 107—7.2

FOREIGN PATENTS 7,574    4/1909  Great Britain.
864,186  3/1961  Great Britain.

RICHARD E. AEGERTER, *Primary Examiner.*

EVON C. BLUNK, *Examiner.*